C. A. ZACHOW.
ATTACHMENT FOR VEHICLES.
APPLICATION FILED AUG. 18, 1908.
913,608.
Patented Feb. 23, 1909.
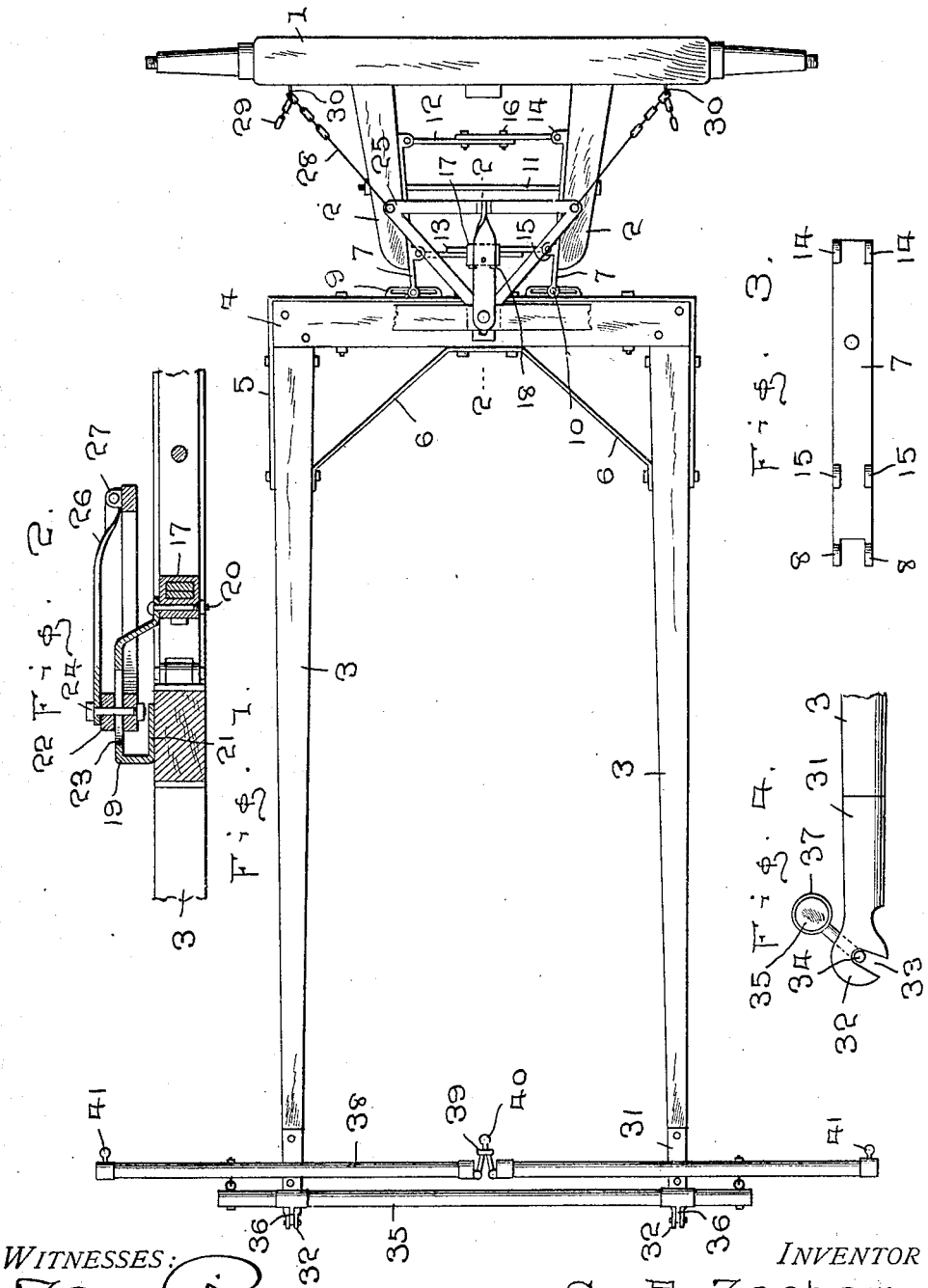

UNITED STATES PATENT OFFICE.

CHARLIE A. ZACHOW, OF FORTVILLE, INDIANA.

ATTACHMENT FOR VEHICLES.

No. 913,608.          Specification of Letters Patent.          Patented Feb. 23, 1909.

Application filed August 18, 1908. Serial No. 449,035.

To all whom it may concern:

Be it known that I, CHARLIE A. ZACHOW, a citizen of the United States, residing at Fortville, in the county of Hancock and State of Indiana, have invented certain new and useful Improvements in Attachments for Vehicles; and I do hereby declare the following to be a full, clear, and exact description of the invention, such as will enable others skilled in the art to which it appertains to make and use the same.

My invention relates to new and useful improvements in attachments for vehicles and my object is to provide means for attaching three draft animals to the vehicle.

A further object is to provide a pair of shafts for the vehicle, whereby the guiding of the vehicle will be accomplished by all three animals.

A further object is to provide supporting means for the outer ends of the shafts.

A still further object is to provide adjustable means for securing the shafts to the vehicle and a still further object is to provide means for connecting the draft direct to the forward axle of the vehicle.

Other objects and advantages will be hereinafter referred to and more particularly pointed out in the claims.

In the accompanying drawings which are made a part of this application, Figure 1 is a plan view of the forward axle of a vehicle, showing my improved attachment applied thereto. Fig. 2 is a detail sectional view on an enlarged scale, as seen on line 2—2, Fig. 1. Fig. 3 is an elevation of a portion of the device employed for securing the shafts to the vehicle, and, Fig. 4 is a detail elevation of the forward end of one of the shafts.

Referring to the drawings in which similar reference numerals designate corresponding parts throughout the several views, 1 indicates the forward axle of a vehicle, which may be constructed in the usual or any preferred manner and extending forwardly from the axle 1, are hounds 2, such as are usually employed for supporting a tongue.

In order to properly guide the vehicle and at the same time provide means for attaching three draft animals thereto, I have provided a pair of shafts 3, which are secured together at their rear ends by means of a cross bar 4, the shafts being rigidly attached to the cross bar by extending a strap 5 a distance along the outer edge of each of the shafts and along the rear edge of the cross bar 4, while the opposite sides of the shafts have secured thereto the ends of a brace 6, said brace being substantially V-shaped and being secured to the cross bar 4 adjacent the longitudinal center of the cross bar, said strap and brace forming a rigid connection between the shafts and cross bar.

The shafts 3 are secured to the hounds 2 by means of bars 7, the outer ends of said bars being provided with ears 8 which are adapted to extend on opposite sides of slotted extensions 9 on the strap 5, bolts 10 being extended through the ears and slots to hold the bars in engagement with the extensions. The bars 7 are extended between the hounds 2 and are secured thereto by means of a bolt 11 and as hounds on different vehicles vary in distance apart and are placed at different angles, I have provided means for adjusting the bars 7 at various angles and distances apart to coöperate with hounds on different vehicles comprising two pairs of overlapping spacing arms 12 and 13, respectively, the arms 12 being pivotally secured between inwardly extending ears 14 at the inner ends of the bars, while the arms 13 are pivotally mounted between ears 15 adjacent the forward end of the bars 7, the overlapping ends of the arms 12 being secured together by extending bolts 16 through the arms, while the arms 13 are introduced through a block 17 and are held in their adjusted positions by means of clamping bolts 18, the arms 12 having slots (not shown) through which the bolts 16 are extended.

A bracket 19 is fixed at one end to the block 17 by introducing a bolt 20 through the block and end of the bracket, the forward end of the bracket being provided with a foot 21, which rests upon the cross bar 4 fastened thereto with a bolt and thereby elevates the body of the bracket above the cross bar, said cross bar being adapted to support a double tree 22. The body portion of the bracket 19 is provided with an oblong slot 23, through which and the double tree 22 extends a pin 24, that portion of the pin below the bracket extending through one end of a triangular-shaped draft frame 25, while the upper end of the pin 24 extends through one end of a hammer strap 26, the rear end of said strap being pivotally mounted between ears 27 on the rear bar of the frame 25.

The frame 25 is attached directly to the axle 1 through the medium of rods 28 and chains 29 attached to one end of the rods, said chains being adapted to engage hooks 30 on the axle 1, while the rods are attached to the frame 25 and by placing the base of the frame 25 in alinement with the axle 1 and extending the rods and chains at the same angle as the angle of the converging portions of the frame, a direct pull is made from the forward end of the frame 25 to the axle.

By providing the slot 23 in the bracket 19, it will be readily seen that the pull on the double tree will be directed against the frame 25 and rods attached thereto, thus removing the entire draft from the shafts and parts employed for securing the same to the axle and it will further be seen that by providing the chains at the ends of the rods, the frame 25 and double tree carried thereby may be adjusted at varying distances from the axle.

The shafts are provided at their outer ends with ferrules 31, that portion of the ferrules extending beyond the ends of the shafts being formed into heads 32, which heads are bifurcated and provided with upwardly extending notches 33, with which are adapted to engage cross heads 34 extending from a yoke 35, the stem 36 to which the cross head 34 is attached, being secured to the yoke 35 by means of a collar 37 and as the notches 33 extend upwardly from the lower edges of the heads 32, the stem 36 will enter between the bifurcated portions of the heads when the cross heads 34 are seated in the notches. The yoke 35 extends to each side of the shafts 3 and has secured to its ends neck yokes 38, the meeting ends of said neck yokes being movably secured together by means of links 39, the engaging ends of the links and the outer ends of the neck yokes having loops 40 and 41, respectively, secured thereto, through which extend the usual or any preferred form of neck strap (not shown).

By providing the main yoke 35 and attaching the same to the ends of the shafts, as shown, and securing the draft animals to the yokes, through the medium of the neck yokes 38, all three of the animals will assist in checking the momentum of the vehicle as well as supporting the weight of the shafts, while the guiding of the vehicle will be practically entirely controlled by the movement of all three horses and as it is only necessary to disengage the cross heads 34 from the notches 33 to release the yoke from the shafts, the draft animals may be quickly released from the shafts when desired. It will further be seen that the shafts and parts employed for securing the same to the running gear of the vehicle may be constructed of comparatively light material, as the strain incident to the draft on the vehicle is entirely removed from the shafts. It will likewise be seen that by providing the adjusting mechanism for securing the shafts to the vehicle, said shafts may be engaged with hounds of any preferred construction and shaped and adjusted to fit the same and it will further be seen that by providing the chains at the ends of the rods 28, the double tree may be moved at varying distances from the axle to compensate for a greater or less amount of draft required to move the vehicle.

What I claim is:

1. In an attachment for vehicles, the combination with an axle having hounds thereon; of shafts, a pair of bars adjustably secured to parts of said shafts, adjustable means for spacing said bars, a bracket extending above and having one of its ends resting on parts of the shafts, said bracket having a slot longitudinally thereof, a double tree resting on the slotted portion of the bracket, a triangular frame having one of its ends extending below the bracket, a pin extending through the double tree, the slot in the bracket and the end of the triangular frame below the bracket, rods extending from the frame and means to adjustably secure the rods to the axle and means for effecting connection between said bracket and said pair of bars.

2. An attachment for vehicles, comprising the combination with an axle having hounds thereon; of shafts a cross bar connecting said shafts, a strap engaging the shafts and cross bar, said strap having a pair of slotted extensions thereon, a pair of bars adjustably secured to the slotted extensions, pairs of overlapping arms pivotally secured to the bars, bolts adapted to clamp the meeting ends of one set of bars together, a block to receive the opposite set of arms and means to clamp the arms in the block.

3. An attachment for vehicles, comprising an axle with its hounds and shafts, opposed bars, means for connecting said bars to a connecting member at the rear ends of said shafts adapted for the lateral adjustment of said bars, adjustable means of connection between said bars, including a tubular block member, a bracket extending above and having one of its ends resting upon the means of connection between said shafts and having its opposite end connected to said tubular block member, a frame member, a double tree, a hammer strap connected at one end to said frame member, a bolt member passing through said hammer strap at its opposite end, said double tree, said frame and a slot in said bracket and means of connection between said frame member and said axle.

4. An attachment for vehicles, comprising an axle with its hounds and shafts, a triangular frame, rod and chain connections between said frame and said axle, a hammer strap having one end connected to said frame about centrally of its rear bar, a bracket having its forward end of substantially right-angled outline with the lower end of said angle formed with a horizontal inward extension resting upon the means of connection between said shafts, opposed spaced-apart bars connected to said hounds, adjustable connections between said bars, said adjustable connection including a tubular block, said bracket having its rear end pivotally connected to said block and slotted and bolt connections between said bars and said shaft connection.

In testimony whereof I have signed my name to this specification in the presence of two subscribing witnesses.

CHARLIE A. ZACHOW.

Witnesses:
    WM. D. COLLINS,
    A. B. AYRES.